United States Patent
Brueggemann

(10) Patent No.: US 6,449,853 B1
(45) Date of Patent: Sep. 17, 2002

(54) CAPACITIVE ANGLE SENSOR

(75) Inventor: Ulrich Brueggemann, Heustreu (DE)

(73) Assignee: Preh-Werke GmbH & Co. KG, Bad Neustadt/Saale (DE)

( * ) Notice: Subject to any disclaimer, the term of this patent is extended or adjusted under 35 U.S.C. 154(b) by 0 days.

(21) Appl. No.: 09/291,330

(22) Filed: Apr. 15, 1999

(30) Foreign Application Priority Data

Apr. 16, 1998 (DE) ............................................. 198 16 810

(51) Int. Cl.[7] ................................................. G01B 3/14
(52) U.S. Cl. .............................. 33/1 PT; 33/1 N; 33/534
(58) Field of Search ............................... 33/1 PT, 1 N, 33/534, 366.11, 366.24; 324/658, 660, 661

(56) References Cited

U.S. PATENT DOCUMENTS

| | | | |
|---|---|---|---|
| 4,630,047 A | * 12/1986 | Tanaka et al. | 324/660 |
| 4,972,725 A | * 11/1990 | Choisnet | 73/862.337 |
| 5,010,775 A | * 4/1991 | Choisnet | 73/862.337 |
| 5,077,635 A | * 12/1991 | Bollhagen et al. | 361/287 |
| 5,172,039 A | * 12/1992 | Owens | 318/489 |
| 5,315,865 A | 5/1994 | Hornfeck et al. | |
| 5,657,006 A | * 8/1997 | Kinoshita et al. | 340/870.37 |
| 5,681,990 A | 10/1997 | Hampo et al. | |
| 5,910,781 A | * 6/1999 | Kawamoto et al. | 340/870.37 |

FOREIGN PATENT DOCUMENTS

| | | | |
|---|---|---|---|
| DE | 33 28 421 A1 | 2/1984 | |
| DE | 4132049 | * 10/1992 | 33/1 N |
| DE | 42 15 702 A1 | 11/1993 | |
| DE | 44 14 529 C2 | 10/1994 | |
| DE | 43 13 886 A1 | 11/1994 | |
| DE | 43 22 750 A1 | 1/1995 | |
| EP | 459118 A1 | 4/1991 | |

OTHER PUBLICATIONS

XP–002108951 Optimum Form of Capacitive Transducer for Displacement Measurement, Article from IEEE Transactions on Instrumentation and Measurement, vol. IM–33, No. 4, Dec. 1984.

* cited by examiner

Primary Examiner—Derris H. Banks
Assistant Examiner—Faye Francis
(74) Attorney, Agent, or Firm—Birch, Stewart, Kolasch & Birch, LLP

(57) ABSTRACT

A capacitive angle sensor that is used preferably in motor vehicles includes a sensor housing (2) having a cover (2') covering the sensor housing (2). A stator (3) and a rotor (4) are positioned in the sensor housing (2), each respectively including a ceramic plate and lying in a plane parallel to the other. The ceramic plates are preferably of an $Al_2O_3$ ceramic. Printed electrode structures of electrodes (5, 6), as sensor capacitances and coupling capacitances (7), are located on sides of the stator (3) and of the rotor (4) facing respectively outward. The electrode structures are printed on back sides of the ceramic plates, so that the electrodes (5, 6, 7), upon assembly into the angle sensor (1), are located on the sides of the stator (3) and of the rotor (4) that face respectively away from each.

9 Claims, 2 Drawing Sheets

CAPACITIVE ANGLE SENSOR

BACKGROUND OF THE INVENTION

This invention relates to a capacitive angle sensor of a type including a rotor fixedly connected for rotation with a sensor shaft and a stator fixed on a sensor housing, the rotor and stator lying in planes parallel to each other.

Because they occupy small structural spaces and fastening points thereof are positioned close to each other, diameters of angle-sensor rotors must be small. So that capacitance of precision capacitors thereof is sufficiently large, a slight separation of the capacitor plates is required. Vibrations and large fluctuations in temperature of a combustion engine, which affect such sensors, make it necessary to structure the sensors to be vibration resistant and non-warping. No partial change in the separation of the capacitor plates arising from warping forces can arise. A dielectric thereof may not change, but must remain sufficiently constant at least within a measuring period. So that a capacitive sensor operates without contact, a rotor signal is not connected with electronics via a wiper, but rather via a series connected decoupling capacitor.

German patent document (DE 43 13 886 A1) discloses a capacitive position and angle sensor that comprises two electrode supports that move with respect to each other. On each electrode support, electrodes, that form sensor capacitance, on the one hand, and coupling capacitance, on the other hand, are positioned opposite each other. At least one electrode of the coupling capacitance is coated with a wear-resistant metal-oxide passivation coating so that, upon assembly of the two electrode supports to form a sensor, this passivation coating assures a stable brace for the two movable electrode supports and at the same time includes an air dielectric.

German patent document (DE 43 22 750 A1) discloses a capacitive rotational angle sensor that includes a rotor disk that is fixedly connected for rotation with a sensor shaft and at least one stator disk fixed on a sensor housing, the two being arranged in parallel planes to each other and having electrode structures on their sides facing each other. A dielectric coating comprised of a PTFE lubricating varnish is applied to the electrodes, which form a rotational-angle-dependent capacitance, for providing an electrode separation. Both the stator disk and the rotor disk are positioned centrally on the sensor shaft within the sensor housing.

German patent document (DE 44 14 529 C2) discloses a rotational angle sensor of a capacitance type. The rotational angle sensor disclosed therein has two fixed electrodes divided by intermediate spaces, as well as a third, rotatably-mounted electrode that is also divided by an intermediate space.

United States patent document (U.S. Pat. No. 5,681,990) discloses a capacitive sensor for determining a setting position of a throttle valve. This sensor has a movable electrode plate and an output electrode. Conducting and insulating segments are placed on the movable electrode plate facing the output electrode. A rotor is located between the two electrodes, on a circumference of which a collar is applied for ensuring a defined distance between the electrodes within the sensor.

It is an object of this invention to provide a capacitive angle sensor in which, despite vibration and influences of temperature, a rotor is held in a non-warping manner and with an even spacing to a stator.

SUMMARY OF THE INVENTION

According to principles of this invention, a parallel rotor and stator of a capacitive angle sensor are structured as ceramic plates having electrode structures on their sides facing away from each other, with the ceramic plates forming a dielectric.

BRIEF DESCRIPTION OF THE DRAWING

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
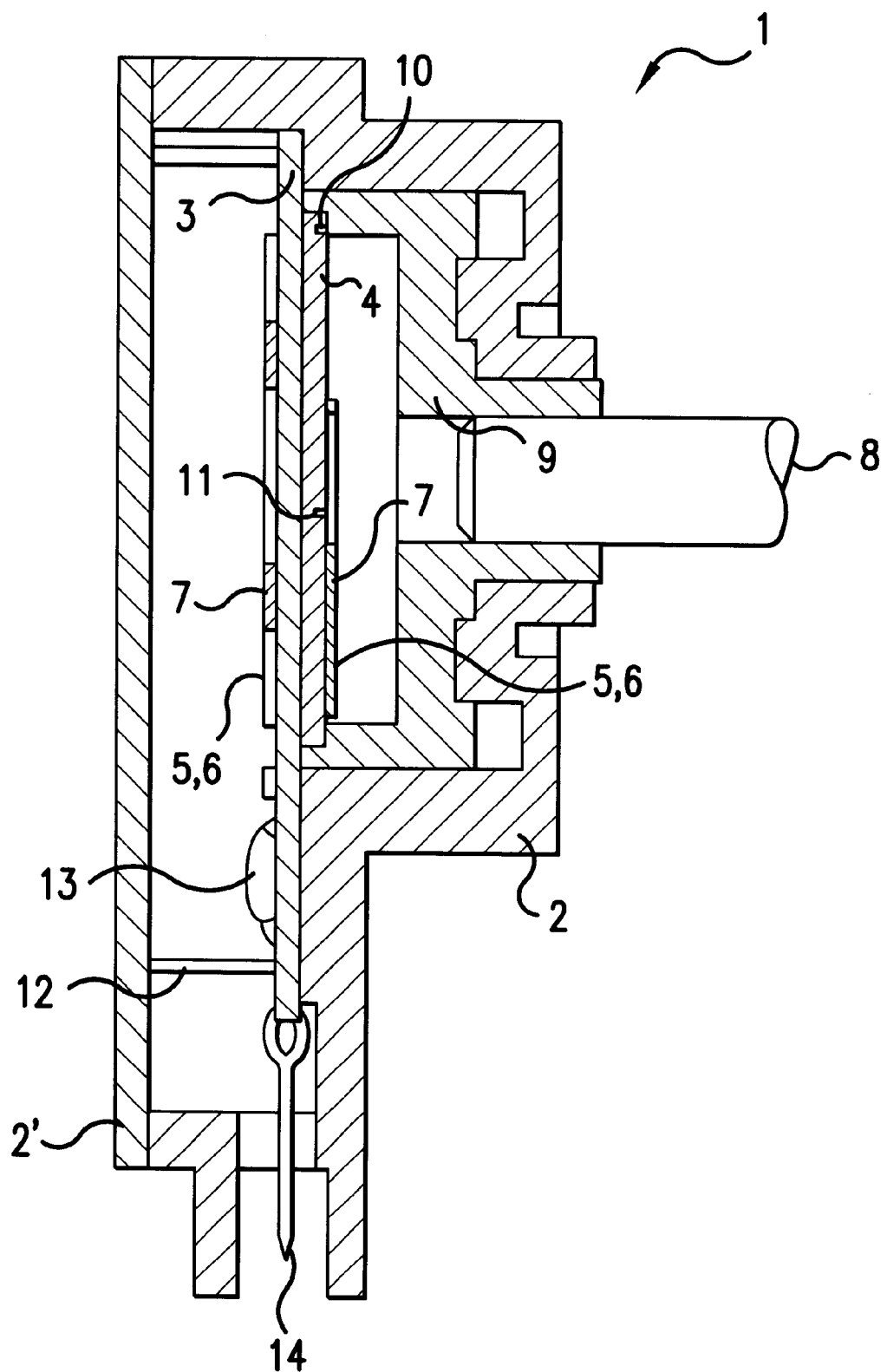
FIG. 1 is a cross sectional view taken through a sensor of this invention.

According to FIG. 1, an angle sensor 1 of this invention includes a sensor housing 2 having a cover 2' that seals with the sensor housing 2. In the sensor housing 2, a stator 3 is positioned as one electrode support, and a rotor 4 as another electrode support, each being comprised of a ceramic plate and lying in a plane parallel with respect to the other. The ceramic plates preferably are of an $Al_2O_3$ ceramic. Printed electrode structures of electrodes 5 and 6, formed respectively as sensor and a coupling capacitances, or capacitance elements, 7 (FIGS. 2 and 3) are located on respective sides of the stator 3. and of the rotor 4 facing away from each other.

The rotor 4 is mechanically connected with a sensor shaft 8 via an adapter 9, and is held so that it can rotate. The sensor shaft 8 is rigidly connected with the adapter 9, is engaged with the sensor housing 2, via this adapter 9, so that it can rotate, and extends outside the sensor housing 2, where it, the sensor shaft 8, is fixedly coupled to a measured object for rotation therewith. This measured object can be a throttle valve adjustor unit, for example, which is not shown in further detail.

The adapter 9 engages in recesses 11 of the rotor 4 via small lugs 10, so that turning the sensor shaft 8 causes a direct turning of the rotor 4. The stator 3 is connected to the sensor housing 2, particularly to the cover 2', via fasteners 12 and is secured against rotation.

A shape of the stator 3 is preferably adapted to the sensor housing 2. In this manner, the ceramic plate of the stator 3 can be rectangular in shape if the sensor housing 2 is also rectangular in an area of the stator 3 that is to be mounted.

Evaluator electronics 13 preferably are located on the ceramic plate of the stator 3. These evaluator electronics 13 generate a signal that represents a measurement result. Via a plug connection 14, this signal is transmitted from the angle sensor 1 for further processing. The fasteners 12 may be omitted as means of fastening the stator 3 to the sensor housing 2 if the sensor housing 2 has a recess for the evaluator electronics 13, or if the evaluator electronics are not on the electrode support. Then only a direct snap fitting of a frame edge of the stator 3 in a receiving area of the sensor housing 2 is required.

To prevent friction from arising between the stator 3 and the rotor 4, a sliding material is placed between these two prior to assembly, for example, which improves sliding characteristics between the ceramic plates as well as absolute capacitance values. At the same time, moisture is prevented from penetrating between the ceramic plates. In addition, a space between the stator 3 and the sensor housing cover 2' can be foam filled or otherwise insulated so that moisture cannot penetrate into the sensor 1 generally.

By using ceramic plates for the stator 3 and the rotor 4, the electrode structures of the capacitances can be printed. In this manner, the electrode structures of the stator 3 form one of two capacitor plates, and the electrode structures of the rotor 4 the other. A linearity or microlinearity of the capacitance is determined by a printing format, such as screen printing, during coating. What is important in a measurement principle of this type is not a coating thickness, but a precise execution of edge areas, since this has an effect on the microlinearity of the rotary capacitor.

Figure 2:
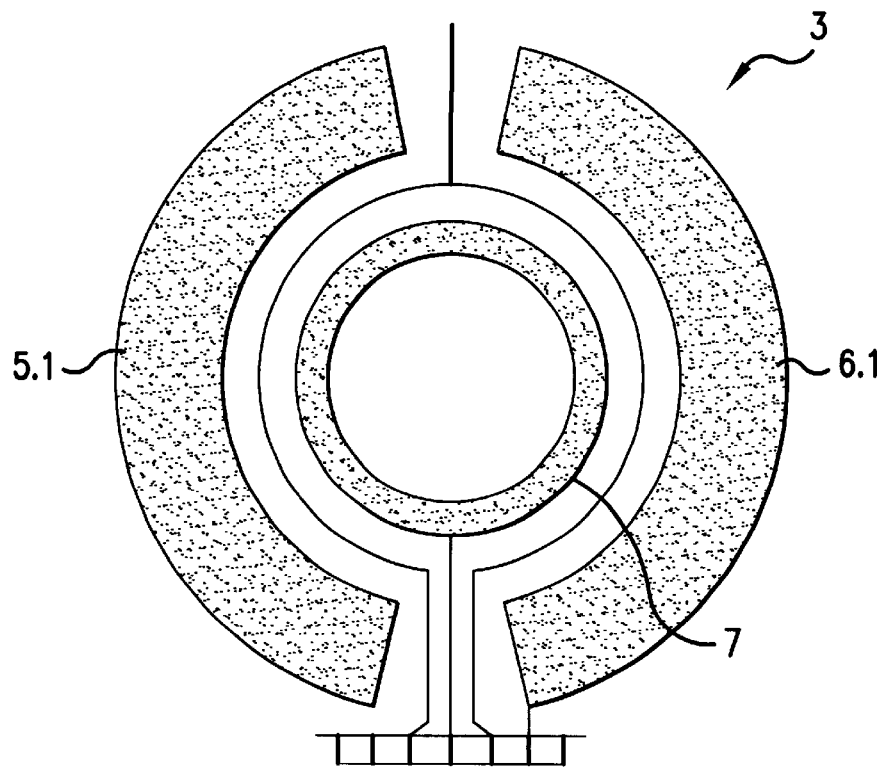
FIG. 2 is a top view of one electrode support of the sensor.

As shown in FIG. 2, electrode structures of electrodes 5 and 6 (designated in FIG. 2 as 5.1 and 6.1) of the sensor capacitances are located on one of the electrode supports, such as the stator 3 for example, which are thus preferably divided into individual capacitancies, or capacitance elements, as well as the electrode 7 as a coupling capacitance.

Figure 3:
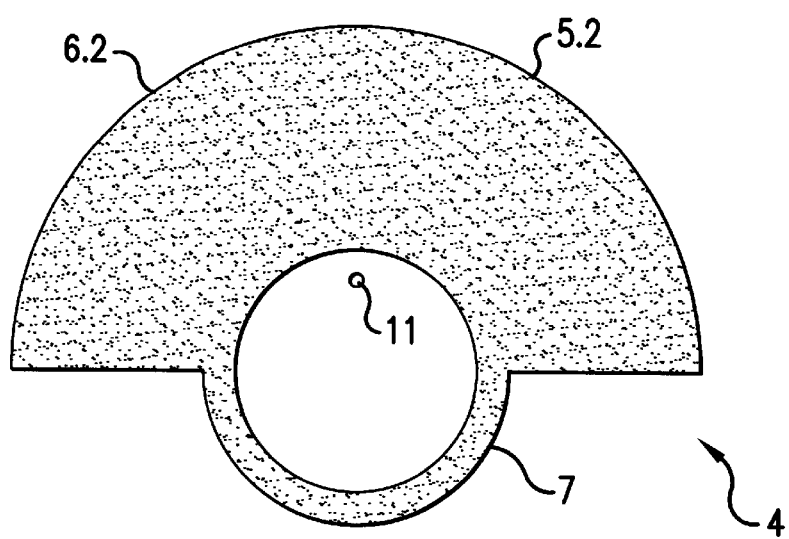
FIG. 3 is a top view of a further electrode support of the sensor.

An electrode structure corresponding to the electrodes 5 (5.2), 6 (6.2) and 7, as a second capacitor plate, is located on the other electrode support, the rotor 4, as shown in FIG. 3. All three of these electrodes that form the capacitances are preferably integrated together into one electrode structure.

The arrangement and division of the electrodes 5 and 6 makes possible a relative measurement of the opposite-phase changing capacitances. In this sensor, since it is not an absolute capacitance but rather a ratio of the two measuring capacitances that are evaluated against each other, any interference that impacts the two measuring capacitances is compensated for. A measurement value, therefore, is no longer dependent on temperature. Through the opposite-phase change of these divided condensers/capacitances, the angle sensor 1 is no longer dependent upon the absolute value of the sensor capacitances. The effects of the change in capacitances relative to each other are used in this process.

The evaluator electronics 13 receives a signal from the first capacitor, which is formed by the divided electrode 5. 1 of the stator and the electrode 5. 2 of the rotor 4, and another signal from the second capacitor, which is formed by the other electrode 6. 1 of the stator 3 and the electrode 6. 2 of the rotor 4, from which an electrical output signal that is linearly dependent upon the changing capacitor surfaces/geometries is produced. This linear dependency is constant in broad areas, and thus the measurement result is accurate. Independent of positions of the electrodes 5. 2, 6. 2 of the rotor 4 and of the electrodes 5. 1, 6. 1 of the stator 3 with respect to each other, the function as a coupling capacitance is ensured at all times by the closed loop shape of the electrode 7 on the ceramic plate of the stator 3 and of the rotor 4. This coupling capacitance can also be positioned outside the divided electrodes 5 and 6.

The invention is based on the idea of using ceramic plates as electrode supports for a stator and a rotor, respectively. These ceramic plates lie flat against each other without any intervening space, whereby a bearing effect is achieved at the same time.

Capacitor surfaces are printed as electrode structures on back sides of the ceramic plates, so that the electrodes, upon assembly-into the sensor, are located on the sides of the stator and the rotor that face outward, respectively. The rotor diameter itself is kept small and can be less than 30 mm. Both ceramic plates also assume the function of a dielectric coupling medium, whereby, at a dielectric constant $\in_r$ of approximately 8 and a standard thickness of 0.63 mm, the dielectric coupling medium corresponds to a dielectric constant of an air capacitor having a plate separation of 0.15 mm. The ceramic is of a good standard quality, so that planar flat fitting of the two plates is achieved.

Because of particular coefficients of expansion of ceramic, the sensor can also be used at higher temperatures. The temperature range is from −40° to +150° C.

Advantageous embodiments are contained in the subclaims below.

Thus evaluator electronics can be applied directly to the ceramic stator plate. Since capacitive displacement and angle sensors are very sensitive in the presence of polar fluids, such as water for example, this problem is solved in the present structure by placing a sliding material, such as a drop of oil for example, between the two ceramic plates. In this manner, moisture is prevented from precipitating between the two ceramic plates. In addition to improving sliding, trapping of air is also prevented in this manner, which can reduce absolute capacitance. In addition, the sensor housing can also be foam filled, or poured, or otherwise insulated or plugged, so that neither moisture nor dirt can change the electrical fields in the sensor housing. For protecting against external electrical fields, the housing can be made of a conductive material, or can be coated with conductive materials.

The invention claimed is:

1. A capacitive angle sensor comprising a rotor fixedly connected for rotation with a sensor shaft and a stator fixed to a sensor housing, the rotor and the stator respectively including electrode structures thereon which are for being capacitively coupled with the other, the rotor and stator extending in parallel planes and sharing a common plane with respect to each other, wherein at least one of the rotor (4) and the stator (3) is structured to include a ceramic plate having the electrode structure (5, 6, 7) on its side facing away from the other of the rotor and the stator, with the ceramic plate forming a dielectric layer between the electrode structures of the rotor and the stator.

2. Capacitive angle sensor as in claim 1, wherein the rotor (4) is mechanically connected to the sensor shaft (8) via an adapter (9).

3. Capacitive angle sensor as in claim 2, wherein the sensor shaft (8) is rotatably mounted via this adapter (9) in the sensor housing (2), and extends outside the sensor housing (2).

4. Capacitive angle sensor as in claim 2, wherein the adapter (9) engages in recesses (11) of the rotor (4) via lugs (10), so that any turning of the sensor shaft (8) causes a direct turning of the rotor (4).

5. Capacitive angle sensor as in claim 1 wherein the stator (3) is secured against turning with respect to the sensor housing (2), the shape of the stator (3) being adapted to the sensor housing (2).

6. Capacitive angle sensor as in claim 1 wherein a space between the stator (3) and a sensor housing cover (2') is filled so that moisture is prevented from penetrating.

7. Capacitive angle sensor as in claim 1 wherein the electrode structures of the electrodes (5 and 6) are divided into individual capacitances, as sensor capacitances.

8. Capacitive angle sensor as in claim 1 wherein the stator is formed of a ceramic plate and wherein evaluator electronics(13) are located directly on the ceramic plate of the stator (3).

9. Capacitive angle sensor as in claim 1 wherein the electrode structurel is printed on the ceramic plate of the at least one of the stator (3) and the rotor (4).

* * * * *